(12) United States Patent
Jonckheere et al.

(10) Patent No.: US 7,052,423 B2
(45) Date of Patent: May 30, 2006

(54) UTILITY MACHINERY AND ASSOCIATED REVERSIBLE FEEDER MECHANISMS

(75) Inventors: Marc R. M. Jonckheere, Snellegem (BE); Oldemar Boeck, Xaxim—Curitiba PR (BR)

(73) Assignee: CNH America LLC, Racine, WI (US)

( * ) Notice: Subject to any disclaimer, the term of this patent is extended or adjusted under 35 U.S.C. 154(b) by 356 days.

(21) Appl. No.: 10/448,842

(22) Filed: May 30, 2003

(65) Prior Publication Data

US 2005/0181900 A1    Aug. 18, 2005

(30) Foreign Application Priority Data

May 31, 2002    (GB) ................ 0212649.8

(51) Int. Cl.
*F16H 7/02*    (2006.01)
(52) U.S. Cl. ....................................... 474/148
(58) Field of Classification Search ............ 474/148, 474/101; 56/10.4
See application file for complete search history.

(56) References Cited

U.S. PATENT DOCUMENTS

| | | | |
|---|---|---|---|
| 2,797,590 A | 7/1957 | Reeves | |
| 2,888,840 A | 6/1959 | Witzel | |
| 3,267,761 A | 8/1966 | Wenning | |
| 3,824,864 A | 7/1974 | Muller | |
| 4,430,847 A | 2/1984 | Tourdot | 56/10.7 |
| 4,511,348 A | 4/1985 | Witdoek | 474/109 |
| 4,592,737 A | 6/1986 | Dhont | |
| 5,778,644 A | 7/1998 | Keller | 56/11.2 |
| 2004/0045268 A1* | 3/2004 | Nafziger | 56/10.4 |

FOREIGN PATENT DOCUMENTS

| | | |
|---|---|---|
| DE | 19922619 A1 | 12/2000 |
| EP | 0097986 | 1/1984 |
| EP | 1072817 A2 | 7/2000 |
| EP | 1044598 A1 | 10/2000 |
| EP | 1160490 A1 | 12/2001 |
| EP | 1371279 A1 | 11/2003 |
| FR | 1294463 | 5/1962 |
| GB | 1555162 A | 11/1979 |

* cited by examiner

*Primary Examiner*—Vicky A. Johnson
(74) *Attorney, Agent, or Firm*—Rebecca Henkel

(57) ABSTRACT

A drive mechanism for utility machinery is disclosed. The mechanism includes a driver wheel and a driven wheel that are coupled by means of an endless flexible band trained around outer rims of the driver and driven wheels. The driver wheel is adapted to transmit drive to the driven wheel in a forward direction F along a loaded side of the band. The mechanism further comprises an idler wheel that runs on an outer side of the band and applies an inwardly directed tensioning force to the band on a run of the band that is unloaded when forward drive is being transmitted. A reverse driver is positioned between the idler wheel and the driven wheel on an inner portion of the side of the band that is unloaded during forward drive. The reverse driver is adapted to selectively provide a reverse drive to the band.

54 Claims, 2 Drawing Sheets

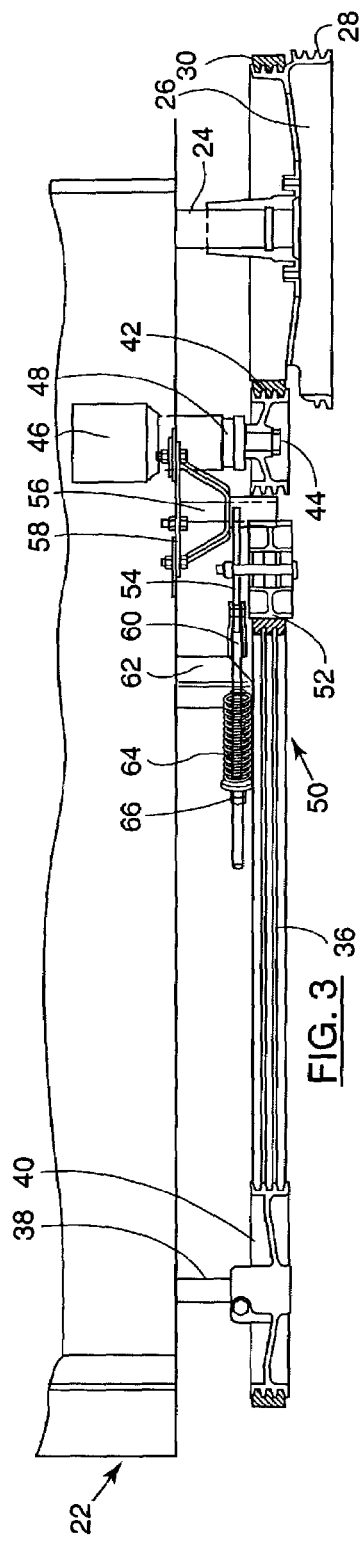
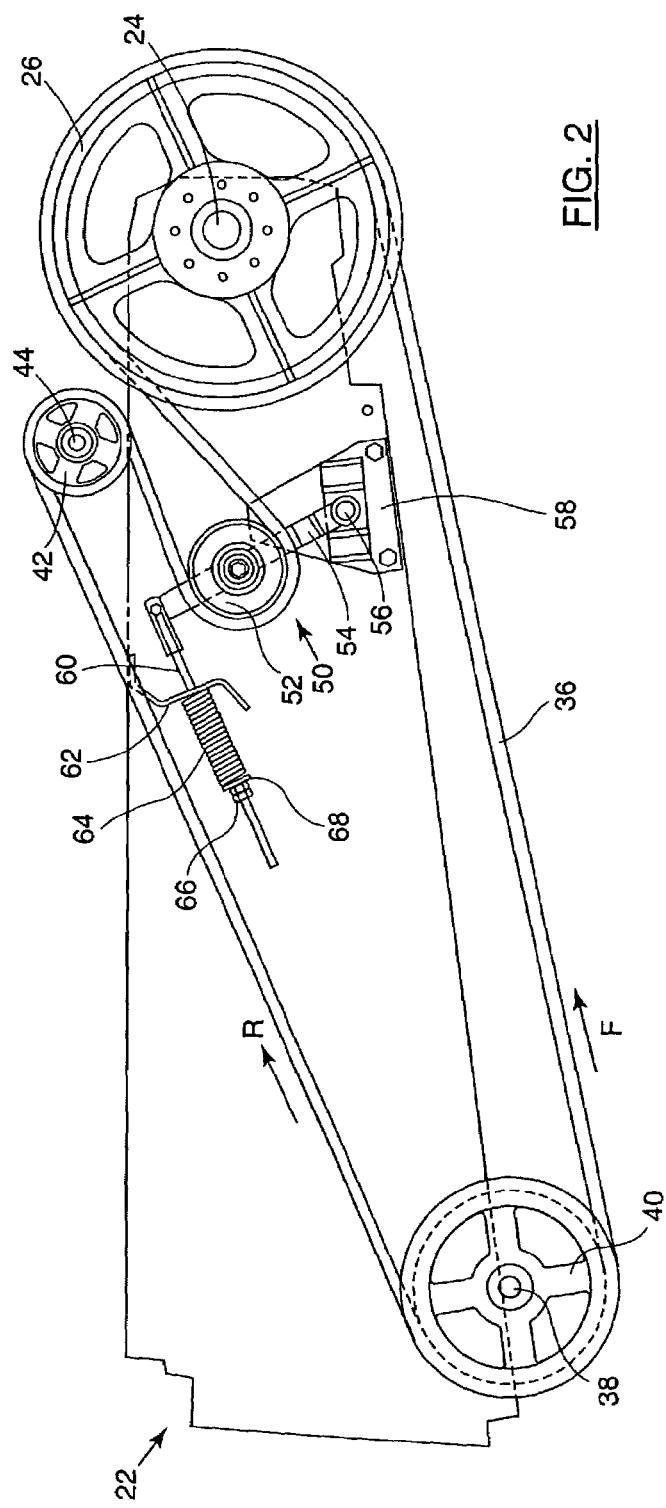
FIG. 3
FIG. 2

UTILITY MACHINERY AND ASSOCIATED REVERSIBLE FEEDER MECHANISMS

FIELD OF THE INVENTION

The present invention relates to utility machinery and associated feeder mechanisms and in particular, but not exclusively, to arrangements adapted for reversing the operation of such feeder mechanisms.

BACKGROUND TO THE INVENTION

It is known to provide utility machinery with a feeder mechanism fed with material gathered by gathering elements. The gathering elements may be configured to gather the material from an operating area somewhat wider than the machine and to move the gathered material to the feeder mechanism. They may form a two stage gathering process, which initially involves collecting in the material across the width of a window of operation and moving some material inwards towards an intake mouth or conveyor of the feeder mechanism, e.g. material collected in portions of the operating area that lie outboard of that intake mouth/conveyor. The feeder mechanism then conveys the gathered material into the machine for processing and/or redistribution.

Some known arrangements of this general type may be found on certain utility machinery used for agricultural harvesting, such as combine harvesters or forage harvesters. Many such machines are fitted with a header attachment that includes the gathering elements in the form of a primary crop gatherer, such as a pick-up drum, a reel or a crop cutter, and a secondary crop gatherer such as an auger. It is known to drive the primary and secondary crop gathering elements in common, so as to gather crop and to convey it to the feeder mechanism substantially continuously and at a synchronised rate. This is achieved using a drive band, such as a belt or chain drive, running between drive wheels associated with the gathering elements, e.g. pulleys, toothed wheels, sprockets or pinions as the case may be.

The secondary gathering element is generally rearward of the primary gathering element and for convenience is the driver. It is driven itself by a lower shaft of the feeder mechanism, which acts as the header drive shaft. In this manner, at least in some base models, the feeder mechanism and the header are driven substantially in unison.

It is not unknown for the feeder mechanism or one or the other gathering elements to become jammed, as may happen in the event of a slug of crop being drawn in which is too large to be processed. Such a situation might cause one or both of the gathering elements to stall partially or fully, which can mean a delay in harvesting while the jam is cleared. To try and reduce the inconvenience this might cause and to speed up clearance of such blockages, it is further known to provide the ability to drive the gathering elements in reverse, so as to aid removal or redistribution of the cause of the blockage. As drive to the header attachment and consequently its gathering elements is provided from a drive band of the feeder mechanism, header reversal is achieved by reversing the direction of travel of that drive band.

In U.S. Pat. No. 4,430,847 a crop feed mechanism is proposed in which, upon detection of a jammed condition in a crop conveyor or an auger, a user operates the feeder drive mechanism in reverse. The reversing arrangement includes a hydraulic motor adapted to drive the feed conveyor and auger in the opposite direction to that used for gathering crops. The feed reverse drive mechanism includes a sprocket secured for rotation with the upper feed drive shaft, a sprocket secured to an output of the hydraulic motor and an endless flexible drive chain tensioned by an idler sprocket whose mounting bolt may be selectively positioned vertically along a slot in an idler mounting bracket. The mechanism further includes a relief valve in the pump hydraulic circuit to prevent the delivery of excessive torque to the conveyors and auger during a feed reversing operation. In this prior art arrangement, an additional driveline is added to the machine in order to provide reversing of the feeder mechanism.

It is generally desirable in the art to develop systems which reduce one or more of the parts count, complexity and associated cost of providing, using and/or maintaining drive arrangements such as those used to reverse the direction of operation in a feeder mechanism of utility machinery.

SUMMARY OF THE INVENTION

It is an object of the present invention to provide improved utility machinery. It is a further object of the present invention to provide improved feeder mechanisms for such machinery, which include a facility for reverse drive. It is also a further object of the present invention to provide methods for operating such improved machinery and mechanisms.

Accordingly, the present invention provides a drive mechanism for utility machinery, said mechanism including:
  a) a driver wheel and a driven wheel that are coupled by means of an endless flexible band trained around outer rims of said driver and driven wheels, said driver wheel being adapted to transmit drive to said driven wheel in a forward direction along a loaded side of said band;
  b) an idler wheel that runs on an outer side of said band and that applies an inwardly directed tensioning force to said band on a run of said band that is unloaded when said forward drive is being transmitted; and
  c) a reverse driver that is positioned between said driven wheel and said idler wheel on an inner portion of the side of said band that is unloaded during forward travel, said reverse driver being adapted to selectively provide a reverse drive to said band.

It will be appreciated that the side of the band that is loaded during forward operation may be referred to by some in the art as the tight side of the band. In related fashion, the side of the band that is unloaded during forward operation may be referred to by some in the art as the slack side of the band.

Said idler wheel may be adapted to apply said inward tensioning force in such a manner that a run of said band between said driven wheel and said reverse driver is tensioned during the application of said reverse drive.

Said idler wheel may be located in the unloaded side of said band regardless of the direction of drive. A run of said band between said driver wheel and said idler wheel and a run of said band between said reverse driver and said idler wheel may be substantially symmetric.

Said reverse driver may be adapted to selectively provide forward drive. Said reverse driver may be adapted to provide forward drive with a lower level of tensioning of said band than is used when applying forward drive using said forward drive wheel.

Said reverse driver may be closer than said idler wheel to said driver wheel. Said idler wheel may be closer than said reverse driver to said driven wheel.

Said idler wheel may be attached to an arm that pivots about a fixed fulcrum in the region of one end and about which fulcrum said tensioning force is applied from a bias means connected to said arm. Said bias means may comprise a linear acting bias means, comprising for example a spring disposed along a rod member and adjustably preloaded against a stop so as to apply an inward bias to said arm.

Said reverse driver may comprise a hydraulic motor. Said reverse driver may include a freewheel arrangement adapted to freewheel its output during forward drive of said band. Said reverse driver may include a clutching arrangement for selective engagement of reverse drive, preferably under the control of a control means. Said driver wheel may be adapted to freewheel during the application of reverse drive to said band. Said band may comprise a drive belt and said wheels and reverse driver may comprise belt pulleys. Said wheels and said reverse driver may be orientated in a substantially vertical plane and the run of said band that is loaded during forward drive thereof may comprise a lower run of said band.

Said mechanism may comprise a feeder mechanism of an agricultural machine, such as a combine harvester or a forage harvester. Said driven wheel may be adapted to drive a header attachment of said agricultural machine. Said reverse drive may be adapted for use in clearance of a blockage in an arrangement for crop gathering, conveying or processing.

The present invention also provides a method of reversing the drive in a feeder mechanism of utility machinery, the method including:
a) coupling a driver wheel and a driven wheel using an endless band;
b) providing a reverse driver along a run of said band that is unloaded during forward drive and selectively providing reverse drive to said band therefrom; and
c) providing an idler wheel between said reverse driver and said driver wheel and applying tension to said band using said idler wheel in such a manner that said band is tensioned between said driver wheel and said driven wheel during forward drive and between said driven wheel and said reverse driver during reverse drive.

The method may include applying an inwardly directed tensioning force to said band through said idler wheel in such a manner as to tension a run of said band between said driven wheel and said reverse driver while driving said band in a reverse direction.

The method may include locating said idler wheel in the unloaded side of said band regardless of the direction of drive. The method may include selectively providing forward drive using said reverse driver. The method may include providing forward drive with a lower level of tensioning of said band than is used when applying forward drive using said forward drive wheel.

The method may include applying said reverse drive by selectively engaging a clutch mechanism associated with said reverse driver. The method may include positioning said reverse driver nearer than said idler wheel to said driver wheel. The method may include positioning said idler wheel nearer than said reverse driver to said driven wheel.

Said utility machine may comprise an agricultural machine, such as a combine harvester or a forage harvester.

BRIEF DESCRIPTION OF THE DRAWINGS

FIG. 2 is a detailed side elevation of a drive arrangement for a feeder mechanism of the machine of FIG. 1, and FIG. 3 is a plan view of the drive arrangement illustrated in FIG. 2.

DETAILED DESCRIPTION OF A PREFERRED EMBODIMENT

Figure 1:
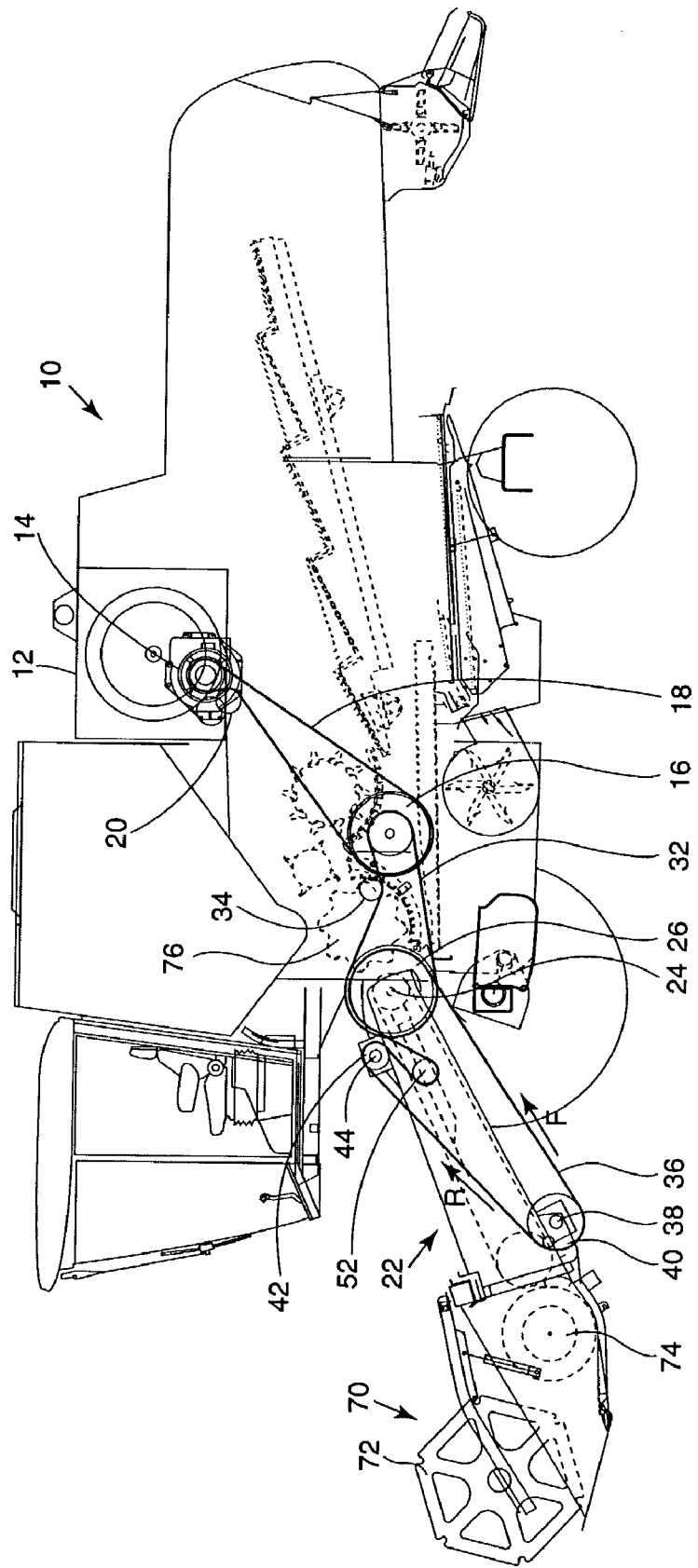
FIG. 1 is a side elevation of a utility machine including an arrangement according to the present invention.

The present invention will now be described with reference to certain embodiments and with reference to the above mentioned drawings. Such description is by way of example only and the invention is not limited thereto. The drawings are schematic and the terms "front", "rear", "forward", "rearward", "right and "left" where used are determined with respect to the normal direction of movement of the machine in use. For convenience, the specific but non-limiting examples discussed herein will concentrate on agricultural machinery and in particular self-propelled combine harvesters, although it will be appreciated that similar arrangements may also be provided in other forms of agricultural crop processing machinery such as forage harvesters. Further utility machinery may comprise earth moving, processing or construction equipment. It will also be noted that the utility machinery need not be self propelled and that embodiments exist which are stationary or may be in trailer form, in either case being adapted to be driven for material processing by an external input such as a tractor power take-off.

Referring now to the drawings, a self-propelled combine harvester 10 includes a prime mover in the form of a diesel engine 12. The engine 12 may be adapted to operate at a substantially constant speed and to vary its output torque to the meet the demand of a plurality of belt and/or chain drives powered off a directly driven engine output pulley 14. Torque output of the engine 12 is controlled by varying its fuelling. However, the present invention may be applied to utility machinery whose prime mover does not operate at constant speed. The belt/chain drives are preferably disposed in substantially vertical planes, such that gravity does not pull the belts/chains off their drive wheels, which may be pulley wheels or gear wheels respectively as the case may be.

An intermediate drive pulley 16 is supplied with drive from the engine output pulley 14 via an intermediate drive belt 18, tensioned by an intermediate drive belt idler 20. Drive to an upper shaft 24 of a feeder mechanism 22 is taken off the intermediate pulley 16 via a feeder input drive belt 32, tensioned by a feeder input drive belt idler 34.

Turning now to the feeder mechanism 22 in greater detail, it includes a feeder upper shaft pulley 26, through which drive from the intermediate pulley 16 is transmitted to the feeder upper shaft 24. This is accomplished by training the feeder input drive belt 32 over an input belt surface 28 of the feeder upper shaft pulley 26 and driving it in a forward direction.

Forward drive of the feeder upper shaft pulley 26 is translated into forward drive F of a feeder drive belt 36. This is accomplished by training the feeder drive belt 36 around the outside of an output belt surface 30 of the feeder shaft upper pulley 26, that output belt surface 30 being inboard of the input belt surface 28 in the embodiment shown. The feeder drive belt 36 is also trained around a feeder lower shaft pulley 40, which is itself connected to a feeder lower shaft 38 from which drive is supplied to an attachment such as grain header 70. The side of the feeder drive belt 36 which is loaded during forward drive F is the lower run of that belt 36 and is uninterrupted between the upper and lower shaft pulleys 26, 40. This side of the belt run may be referred to as the tight side of the belt 36.

On the side of the feeder drive belt 36 that is unloaded during forward drive F, a reverse drive arrangement 42, 44, 46, 48 is included. This side of the belt run may be referred to as the slack side of the belt 36. The reverse drive includes a hydraulic motor 46, incorporating a clutch 48 adapted to selectively engage and disengage reverse drive R from the motor 46 under the control of a control means. The clutch can be an automatically engaging clutch or can be engaged by a separate mechanism. Motor output, and therefore reverse drive R, is transmitted through the clutch 48 via a reverse drive shaft 44 to a reverse drive pulley 42 and from there to the inside surface of the feeder drive belt 36.

In the feeder belt run between the reverse drive pulley 44 and the feeder upper shaft pulley 26, there is included a feeder drive belt tensioning assembly 50. The assembly comprises a feeder belt idler wheel 52 which runs on the outer side of the feeder drive belt 36 and is adapted to apply a belt tensioning force inwardly to the belt 36. The idler wheel 52 is mounted on a pivot arm 54 that is adapted to pivot about a fulcrum 56, the fulcrum 56 being fixed in position and incorporated in a mounting bracket 58 rigidly attached to the housing of the feeder mechanism 22.

The level of the tensioning force applied to the feeder drive belt 36 is controlled by a tensioning rod 60 that is pivotally connected at a predetermined point along the length of the pivot arm 54. It may be noted that the tensioning rod in the particular embodiment illustrated is connected to the point of the arm 54 furthest from the fulcrum 56. This provides the maximum mechanical advantage to the tensioning rod 60 and therefore minimises the level of bias required to produce a given tension in the feeder belt 36. It will be appreciated that the tensioning rod 60 may be connected to the pivot arm elsewhere along it, for example in the event that space is a constraint.

Bias is applied to the tensioning rod 60 in a substantially linear manner so as to pull the rod 60 and the pivot arm 54 towards the inner side of the feeder belt 36 and thereby to apply to it a predetermined belt tensioning force. The bias may be applied by compression of a coil spring 64 between a backing washer 68 and a bracket 62 which is affixed to the feeder housing, or by any similar or equivalent device such as a hydraulic or pneumatic cylinder. Adjustment of the spring compression is performed using an adjuster and locking nut arrangement 66 threaded onto the tensioning/adjusting rod 60 and acting on the non-spring side of the backing washer 68.

Turning now to the header 70, drive to this assembly is provided from the feeder lower drive shaft 38, sometimes also referred to as the header drive shaft. In the case of the combine harvester 10 under consideration in this embodiment, a primary crop-gathering element is in the form of a reel 72. During forward motion of the combine harvester 10, the reel 72 guides gathered crop stems backward into the header attachment 70. Rearwards of the pick-up wheel 72, a secondary gathering element in the form of an auger 74 moves wide gathered crop in towards the middle of the header attachment 70 and into the feeder mechanism 22. The feeder mechanism 22 moves the gathered crop upwardly into an intake mouth of a thresher drum 76.

It is not unknown for the header 70 or the feeder mechanism 22 to stall during crop gathering, e.g. by a slug of crop jamming one or the other or even both of the gathering elements 72, 74 or the conveyor inside the feeder housing. If this occurs, an operator may reverse the drive to the header attachment 70 in order to clear the jam. As drive to the header attachment in this embodiment is provided through the feeder mechanism lower drive shaft 38, reversing the action of the auger 74 and/or pick-up wheel 72 entails the application of reverse drive R to the feeder drive belt 36.

During forward drive F, the clutch 48 of the hydraulic motor 46 is disengaged and the reverse drive pulley 42 freewheels. During reverse drive R, however, it is the feeder upper shaft pulley 26 that freewheels by disengagement of the clutch at the prime mover 12. The reverse drive R is applied directly to the feeder drive belt 36 from the reverse drive pulley 42 by engaging the clutch 48. The clutch may be engaged automatically by the pressure of the oil for driving the hydraulic motor 46.

It should be noted here that belt speed employed during reverse drive R is generally not as high as those applied during forward drive F. The reverse drive R is used merely to clear jams in the header 70 or feeder 22 mechanisms and to allow redistribution or removal of the cause of the jam. To increase torque, reduction gearing could be used between the hydraulic drive and the reverse drive pulley wheel 42.

It should be noted that, as best illustrated in FIG. 3, the belt run between the feeder upper shaft pulley 26 and the idler 52 and the belt run between the reverse drive pulley 42 and the idler 52 are substantially symmetric. In addition, the reverse drive pulley 42 is close to the feeder upper shaft pulley 26 and closer to that pulley 26 than is the feeder idler wheel 52. The feeder idler wheel 52 is, however, preferably also close to the header upper shaft pulley 26 and is closer to the feeder lower shaft pulley than is the reverse drive pulley 42. This arrangement ensures that belt tensioning is applied during reverse drive R to the portion of the feeder drive belt 36 which runs between the feeder lower drive pulley 40 and the reverse drive pulley 42. In this manner, one idler 50 provides tension to normally unloaded sides of the feeder drive belt 36 during forward F and reverse R drive respectively. Put another way, the idler wheel 52 is located in the unloaded side of the feeder drive belt 36 regardless of the direction of drive F, R. The reverse drive arrangement may also be adapted to selectively provide forward drive F by reversing the hydraulic drive, with a lower level of tensioning or a lower speed of the feeder drive belt 36 than is used when applying forward drive F using the feeder upper shaft pulley 26 to apply forward drive F. Hence the reverse drive arrangement may be used to inch forwards the feeder mechanism with the utility machine stationary. The reduced belt tensioning is the result of forward drive F from the reverse drive pulley 42 tending to straighten the belt run between the reverse drive pulley 42 and the header shaft upper pulley 26, which in turn pulls the idler wheel 52 against its spring 64. Meanwhile there are no means for tensioning the unloaded side of the feeder drive belt 36 between the reverse drive pulley 42 and the lower drive pulley 40.

Among the advantages of the present invention is a cleaner design than sometimes previously used, with reduced parts count, cost and maintenance associated with eliminating the need for an additional chain drive or equivalent for feeder reversing. While the present invention has been particularly shown and described with respect to a preferred embodiment, it will be understood by those skilled in the art that changes in form and detail may be made without departing from the scope and spirit of the invention.

The invention claimed is:

1. A drive mechanism for utility machinery, said mechanism including:

a) a forward driver wheel and a driven wheel that are coupled by means of an endless flexible band trained around outer rims of said driver and driven wheels, said driver wheel being adapted to transmit drive to said driven wheel in a forward direction along a loaded side of said band;

b) an idler wheel that runs on an outer side of said band and that applies an inwardly directed tensioning force to said band on a run of said band that is unloaded when said forward drive is being transmitted; and c) a reverse driver that is engaged with an inner portion of said band that is unloaded during forward drive along a run of said band extending between said driven wheel and said idler wheel, said reverse driver being adapted to selectively provide a reverse drive to said band.

2. A mechanism according to claim 1, wherein said idler wheel is adapted to apply said inward tensioning force in such a manner that a run of said band between said driven wheel and said reverse driver is tensioned during the application of said reverse drive.

3. A mechanism according to claim 2, wherein said idler wheel is located in the unloaded side of said band regardless of the direction of drive.

4. A mechanism according to claim 3, wherein a run of said band between said driver wheel and said idler wheel and a run of said band between said reverse driver and said idler wheel are substantially symmetric.

5. A mechanism according claim 4, wherein said reverse driver is adapted to selectively provide forward drive.

6. A mechanism according to claim 4, wherein said reverse driver is adapted to provide forward drive with a lower level of tensioning of said band than is used when applying forward drive using said forward drive wheel.

7. A mechanism according to claim 6, wherein said reverse driver is closer than said idler wheel to said driver wheel.

8. A mechanism according to claim 6, wherein said idler wheel is closer than said reverse driver to said driven wheel.

9. A mechanism according to claim 6, wherein said idler wheel is attached to an arm that pivots about a fixed fulcrum in the region of one end and about which fulcrum said tensioning force is applied from a bias means connected to said arm.

10. A mechanism according claim 3, wherein said reverse driver is adapted to selectively provide forward drive.

11. A mechanism according to claim 2, wherein a run of said band between said driver wheel and said idler wheel and a run of said band between said reverse driver and said idler wheel are substantially symmetric.

12. A mechanism according claim 11, wherein said reverse driver is adapted to selectively provide forward drive.

13. A mechanism according to claim 11, wherein said reverse driver is adapted to provide forward drive with a lower level of tensioning of said band than is used when applying forward drive using said forward drive wheel.

14. A mechanism according claim 2, wherein said reverse driver is adapted to selectively provide forward drive.

15. A mechanism according to claim 1, wherein said idler wheel is located in the unloaded side of said band regardless of the direction of drive.

16. A mechanism according to claim 15, wherein a run of said band between said driver wheel and said idler wheel and a run of said band between said reverse driver and said idler wheel are substantially symmetric.

17. A mechanism according claim 16, wherein said reverse driver is adapted to selectively provide forward drive.

18. A mechanism according to claim 16, wherein said reverse driver is adapted to provide forward drive with a lower level of tensioning of said band than is used when applying forward drive using said forward drive wheel.

19. A mechanism according claim 15, wherein said reverse driver is adapted to selectively provide forward drive.

20. A mechanism according to claim 1, wherein a run of said band between said driver wheel and said idler wheel and a run of said band between said reverse driver and said idler wheel are substantially symmetric.

21. A mechanism according claim 20, wherein said reverse driver is adapted to selectively provide forward drive.

22. A mechanism according to claim 20, wherein said reverse driver is adapted to provide forward drive with a lower level of tensioning of said band than is used when applying forward drive using said forward drive wheel.

23. A mechanism according claim 1, wherein said reverse driver is adapted to selectively provide forward drive.

24. A mechanism according to claim 1, wherein said reverse driver is closer than said idler wheel to said driver wheel.

25. A mechanism according to claim 1, wherein said idler wheel is closer than said reverse driver to said driven wheel.

26. A mechanism according to claim 1, wherein said idler wheel is attached to an arm that pivots about a fixed fulcrum in the region of one end and about which fulcrum said tensioning force is applied from a bias means connected to said arm.

27. A mechanism according to claim 1, wherein said reverse driver comprises a hydraulic motor.

28. A mechanism according to claim 1, wherein said reverse driver includes a freewheel arrangement adapted to freewheel its output during forward drive of said band.

29. A mechanism according to claim 1, wherein said reverse driver includes a clutching arrangement for selective engagement of reverse drive.

30. A mechanism according to claim 1, wherein said driver wheel is adapted to freewheel during the application of reverse drive to said band.

31. A mechanism according to claim 1, wherein said band comprises a drive belt and said wheels and reverse driver comprise belt pulleys.

32. A mechanism according to claim 1, wherein said wheels and said reverse driver are orientated in a substantially vertical plane and wherein the run of said band that is loaded during forward drive thereof comprises a lower run of said band.

33. A method of reversing the drive in a feeder mechanism of utility machinery, the method including:

a) coupling a driver wheel and a driven wheel using an endless band;

b) providing a reverse driver along a run of said band that is unloaded during forward drive and selectively providing reverse drive to said band therefrom; and c) providing an idler wheel engaged with said band along a run of said band extending between said reverse driver and said driver wheel and applying tension to said band using said idler wheel in such a manner that said band is tensioned between said driver wheel and said driven wheel during forward drive and between said driven wheel and said reverse driver during reverse drive.

34. A method according to claim 33, including applying an inwardly directed tensioning force to said band through said idler wheel in such a manner as to tension a run of said band between said driven wheel and said reverse driver while driving said band in a reverse direction.

35. A method according to claim 34, including locating said idler wheel in the unloaded side of said band regardless of the direction of drive.

36. A method according to claim 35, including applying said reverse drive by selectively engaging a clutch mechanism associated with said reverse driver.

37. A method according to claim 34, including applying said reverse drive by selectively engaging a clutch mechanism associated with said reverse driver.

38. A method according to any one of claims 34, including selectively providing forward drive using said reverse driver.

39. A method according to claim 38, including providing forward drive with a lower level of tensioning of said band than is used when applying forward drive using said forward drive wheel.

40. A method according to claim 39, including applying said reverse drive by selectively engaging a clutch mechanism associated with said reverse driver.

41. A method according to claim 38, including applying said reverse drive by selectively engaging a clutch mechanism associated with said reverse driver.

42. A method according to claim 33, including locating said idler wheel in the unloaded side of said band regardless of the direction of drive.

43. A method according to any one of claims 42, including selectively providing forward drive using said reverse driver.

44. A method according to claim 43, including providing forward drive with a lower level of tensioning of said band than is used when applying forward drive using said forward drive wheel.

45. A method according to claim 44, including applying said reverse drive by selectively engaging a clutch mechanism associated with said reverse driver.

46. A method according to claim 43, including applying said reverse drive by selectively engaging a clutch mechanism associated with said reverse driver.

47. A method according to claim 42, including applying said reverse drive by selectively engaging a clutch mechanism associated with said reverse driver.

48. A method according to any one of claims 33, including selectively providing forward drive using said reverse driver.

49. A method according to claim 48, including providing forward drive with a lower level of tensioning of said band than is used when applying forward drive using said forward drive wheel.

50. A method according to claim 49, including applying said reverse drive by selectively engaging a clutch mechanism associated with said reverse driver.

51. A method according to claim 48, including applying said reverse drive by selectively engaging a clutch mechanism associated with said reverse driver.

52. A method according to claim 33, including applying said reverse drive by selectively engaging a clutch mechanism associated with said reverse driver.

53. A method according to any one of claims 33, including positioning said reverse driver nearer than said idler wheel to said driver wheel.

54. A method according to any one of claims 33, including positioning said idler wheel nearer than said reverse driver to said driven wheel.

* * * * *